(12) United States Patent
Shepelev et al.

(10) Patent No.: US 10,073,550 B2
(45) Date of Patent: Sep. 11, 2018

(54) CONCURRENT INPUT SENSING AND DISPLAY UPDATING

(71) Applicant: Synaptics Incorporated, Santa Clara, CA (US)

(72) Inventors: Petr Shepelev, San Jose, CA (US); David Sabo, Santa Clara, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 567 days.

(21) Appl. No.: 13/722,225

(22) Filed: Dec. 20, 2012

(65) Prior Publication Data

US 2014/0078097 A1 Mar. 20, 2014

Related U.S. Application Data

(60) Provisional application No. 61/703,614, filed on Sep. 20, 2012.

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC ........ G06F 3/041; G06F 3/0412; G06F 3/044; G09G 3/20; G09G 3/3233;
(Continued)

(56) References Cited

U.S. PATENT DOCUMENTS

| | | |
|---|---|---|
| 5,093,655 A | 3/1992 | Tanioka et al. |
| 5,392,058 A | 2/1995 | Tagawa |

(Continued)

FOREIGN PATENT DOCUMENTS

| | | |
|---|---|---|
| CN | 101051256 A | 10/2007 |
| CN | 101501618 A | 8/2009 |

(Continued)

OTHER PUBLICATIONS

International Search Report and Written Opinion dated Dec. 26, 2013 for Application No. PCT/US2013/057990.

(Continued)

*Primary Examiner* — Jennifer Mehmood
*Assistant Examiner* — Sardis F Azongha
(74) *Attorney, Agent, or Firm* — Patterson + Sheridan, LLP

(57) ABSTRACT

Embodiments of the present invention generally provide a processing system for a display device integrated with a capacitive sensing device. The processing system includes a driver module having driver circuitry and coupled to a sub-pixel with a first source line and a first common electrode. The driver module is configured to simultaneously update the sub-pixel by driving the first source line with a first voltage, and drive the first common electrode for capacitive sensing by modulating the first common electrode between a second voltage and a third voltage. The processing system further includes a receiver module coupled to a plurality of receiver electrodes. The receiver module is configured to receive resulting signals from the receiver electrodes while the first common electrode is modulated between the second voltage and the third voltage. The processing system further includes a determination module configured to determine positional information based on the resulting signals.

20 Claims, 9 Drawing Sheets

(58) Field of Classification Search
CPC ..... G09G 2320/043; G09G 2320/0233; G09G 2300/0842; G09G 2300/0861; H03K 17/962; H03K 17/955
See application file for complete search history.

(56) References Cited

U.S. PATENT DOCUMENTS

| | | | |
|---|---|---|---|
| 5,534,892 A | 7/1996 | Tagawa | |
| 5,896,120 A | 4/1999 | Iguchi et al. | |
| 6,219,113 B1 | 4/2001 | Takahara | |
| 6,239,788 B1 | 5/2001 | Nohno et al. | |
| 7,031,886 B1 | 4/2006 | Hargreaves | |
| 7,451,050 B2 | 11/2008 | Hargreaves | |
| 7,633,566 B2 | 12/2009 | Utsunomiya et al. | |
| 8,243,027 B2 | 8/2012 | Hotelling et al. | |
| 8,643,624 B2* | 2/2014 | Day ................. | G06F 3/0412 345/174 |
| 8,723,841 B2* | 5/2014 | Ishizaki ............... | G06F 3/044 178/18.01 |
| 8,743,300 B2* | 6/2014 | Chang et al. ............... | 349/12 |
| 2004/0095336 A1 | 5/2004 | Hong et al. | |
| 2004/0217945 A1 | 11/2004 | Miyamoto et al. | |
| 2006/0012575 A1 | 1/2006 | Knapp et al. | |
| 2006/0114247 A1 | 6/2006 | Brown | |
| 2007/0074914 A1 | 4/2007 | Geaghan et al. | |
| 2007/0262966 A1 | 11/2007 | Nishimura et al. | |
| 2008/0018581 A1 | 1/2008 | Park et al. | |
| 2008/0018612 A1 | 1/2008 | Nakamura et al. | |
| 2008/0048989 A1 | 2/2008 | Yoon et al. | |
| 2008/0055267 A1 | 3/2008 | Wu et al. | |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0150901 A1 | 6/2008 | Lowles et al. | |
| 2008/0180407 A1 | 7/2008 | Utsunomiya et al. | |
| 2008/0252572 A1* | 10/2008 | Kang ................. | G09G 3/3225 345/77 |
| 2008/0309625 A1 | 12/2008 | Krah et al. | |
| 2008/0309628 A1 | 12/2008 | Krah et al. | |
| 2009/0009194 A1 | 1/2009 | Seguine | |
| 2009/0160461 A1 | 6/2009 | Zangl et al. | |
| 2009/0189867 A1 | 7/2009 | Krah et al. | |
| 2009/0195511 A1 | 8/2009 | Cites et al. | |
| 2009/0256818 A1 | 10/2009 | Noguchi et al. | |
| 2010/0001973 A1 | 1/2010 | Hotelling et al. | |
| 2010/0019780 A1 | 1/2010 | Bulea | |
| 2010/0045635 A1 | 2/2010 | Soo | |
| 2010/0060591 A1 | 3/2010 | Yousefpor et al. | |
| 2010/0066692 A1 | 3/2010 | Noguchi et al. | |
| 2010/0085324 A1 | 4/2010 | Noguchi et al. | |
| 2010/0110040 A1 | 5/2010 | Kim et al. | |
| 2010/0139865 A1 | 6/2010 | Tillement et al. | |
| 2010/0182273 A1 | 7/2010 | Noguchi et al. | |
| 2010/0193257 A1 | 8/2010 | Hotelling et al. | |
| 2010/0194695 A1 | 8/2010 | Hotelling et al. | |
| 2010/0194696 A1 | 8/2010 | Chang et al. | |
| 2010/0194697 A1 | 8/2010 | Hotelling et al. | |
| 2010/0194698 A1 | 8/2010 | Hotelling et al. | |
| 2010/0214262 A1 | 8/2010 | Ishizaki et al. | |
| 2010/0225612 A1 | 9/2010 | Ishizaki et al. | |
| 2010/0265210 A1 | 10/2010 | Nakanishi et al. | |
| 2010/0289765 A1 | 11/2010 | Noguchi et al. | |
| 2010/0295804 A1 | 11/2010 | Takeuchi et al. | |
| 2010/0295824 A1 | 11/2010 | Noguchi et al. | |
| 2010/0302202 A1 | 12/2010 | Takeuchi et al. | |
| 2010/0309162 A1 | 12/2010 | Nakanishi et al. | |
| 2010/0321034 A1 | 12/2010 | Hargreaves | |
| 2010/0328239 A1 | 12/2010 | Harada et al. | |
| 2010/0328255 A1 | 12/2010 | Ishizaki et al. | |
| 2010/0328256 A1 | 12/2010 | Harada et al. | |
| 2010/0328257 A1 | 12/2010 | Noguchi et al. | |
| 2010/0328259 A1 | 12/2010 | Ishizaki et al. | |
| 2010/0328274 A1 | 12/2010 | Noguchi et al. | |
| 2010/0328291 A1 | 12/2010 | Ishizaki et al. | |
| 2011/0050585 A1* | 3/2011 | Hotelling et al. ........... | 345/173 |
| 2011/0061947 A1 | 3/2011 | Krah et al. | |
| 2011/0061948 A1 | 3/2011 | Krah et al. | |
| 2011/0187677 A1 | 8/2011 | Hotelling et al. | |
| 2011/0210939 A1 | 9/2011 | Reynolds et al. | |
| 2011/0210940 A1 | 9/2011 | Reynolds | |
| 2011/0210941 A1* | 9/2011 | Reynolds et al. ........... | 345/174 |
| 2011/0248949 A1 | 10/2011 | Chang et al. | |
| 2011/0267293 A1 | 11/2011 | Noguchi et al. | |
| 2011/0267305 A1 | 11/2011 | Shahparnia et al. | |
| 2011/0316792 A1 | 12/2011 | Huang et al. | |
| 2012/0044167 A1 | 2/2012 | Nakanishi et al. | |
| 2012/0044195 A1 | 2/2012 | Nakanishi et al. | |
| 2012/0092285 A1 | 4/2012 | Osborn et al. | |
| 2012/0162104 A1 | 6/2012 | Chang et al. | |

FOREIGN PATENT DOCUMENTS

| | | |
|---|---|---|
| CN | 1940842 B | 5/2010 |
| CN | 102483659 A | 5/2012 |
| CN | 102540530 A | 7/2012 |
| EP | 1936479 A1 | 6/2008 |
| EP | 1892605 A3 | 7/2008 |
| JP | 2006106853 A | 4/2006 |
| JP | 2007334606 A | 12/2007 |
| JP | 2008090623 A | 4/2008 |
| JP | 2010072581 A | 4/2010 |
| KR | 1010850806 | 11/2011 |
| KR | 20120045992 | 5/2012 |
| TW | 200945147 A | 11/2009 |
| WO | WO-03019346 A1 | 3/2003 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |

OTHER PUBLICATIONS

Chinese Application No. 201380059223.9, Office Action dated Jan. 11, 2017, consists of 13 pages.

* cited by examiner

CONCURRENT INPUT SENSING AND DISPLAY UPDATING

CROSS-REFERENCE TO RELATED APPLICATIONS

This application claims benefit of U.S. Provisional Patent Application Ser. No. 61/703,614, filed Sep. 20, 2012, which is herein incorporated by reference in its entirety.

DESCRIPTION OF THE RELATED ART

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices may include one or more types of electrodes configured for display updating and/or for transmitting input sensing signals. In configurations in which the sensing region of the proximity sensor device is integrated with or overlaps the display region of the computing device, transparent electrodes may be used to prevent the sensing region from significantly obscuring the user's view of the display region. Such electrodes are commonly composed of a transparent conductive oxide material, such as indium tin oxide (ITO).

Proximity sensor devices which include electrodes configured to perform both display updating and input sensing may be operated in two distinct and dedicated modes. In a first mode, during a first dedicated time period, the electrodes may be driven for display updating. In a second mode, during a second dedicated time period, sensing signals may be transmitted to the electrodes to perform input sensing. However, due to hardware conflicts and signal interference, the electrodes generally are not operated in both display updating and input sensing modes at the same time. For instance, operating the electrodes for input sensing while simultaneously updating the display may produce display artifacts. Furthermore, because the time allotted to perform display updating generally cannot be reduced below a specified level, requiring these functions to operate during separate and distinct time periods greatly reduces the time available to perform input sensing.

Therefore, there is a need for an improved method and device for increasing the amount of time available for performing display updating and/or input sensing in proximity sensor devices.

SUMMARY OF THE INVENTION

Embodiments of the present invention generally provide a processing system for a display device integrated with a capacitive sensing device. The processing system includes a driver module having driver circuitry and coupled to a sub-pixel with a first source line and a first common electrode. The driver module is configured to simultaneously update the sub-pixel by driving the first source line with a first voltage, and drive the first common electrode for capacitive sensing by modulating the first common electrode between a second voltage and a third voltage. The processing system further includes a receiver module coupled to a plurality of receiver electrodes. The receiver module is configured to receive resulting signals from the receiver electrodes while the first common electrode is modulated between the second voltage and the third voltage. The processing system further includes a determination module configured to determine positional information based on the resulting signals.

Embodiments of the present invention may also provide a display device integrated with a capacitive sensing device. The display device includes a sub-pixel, a first source line coupled to the sub-pixel, a first common electrode coupled to the sub-pixel, and a plurality of receiver electrodes. The display device further includes a processing system coupled to the first source line, first common electrode, and plurality of receiver electrodes. The processing system is configured to simultaneously update the sub-pixel and drive the first common electrode for capacitive sensing by driving the first source line with a first voltage, and modulating the first common electrode between a second voltage and a third voltage. The processing system is further configured to receive resulting signals from the receiver electrodes while the first common electrode is modulated between the second voltage and the third voltage. The processing system is further configured to determine positional information based on the resulting signals.

Embodiments of the present invention may also provide a method of capacitive sensing with a display device integrated with a capacitive sensing device. The display device includes a sub-pixel, a first source line coupled to the sub-pixel, a first common electrode coupled to the sub-pixel, and a plurality of receiver electrodes. The method includes simultaneously updating the sub-pixel and driving the first common electrode for capacitive sensing by driving the first source line with a first voltage, and modulating the first common electrode between a second voltage and a third voltage. The method further includes receiving resulting signals from the receiver electrodes while the first common electrode is modulated between the second voltage and the third voltage. The method further includes determining positional information based on the resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for concurrently performing input sensing and display updating with one or more common electrodes. The method may include driving one or more sub-pixels with a source voltage while concurrently modulating the voltage of one or more common electrodes coupled to the sub-pixels to perform input sensing with the common electrodes. The source voltage and the voltage(s) at which the one or more common electrodes are modulated may be selected such that, at the end of a driving period, the one or more sub-pixels are charged to a target voltage. Thus, the method and apparatus enables the common electrode(s) to be modulated for input sensing without interfering with display updating of the one or more sub-pixels, greatly increasing the amount of time available for performing input sensing and/or display updating.

Figure 1:
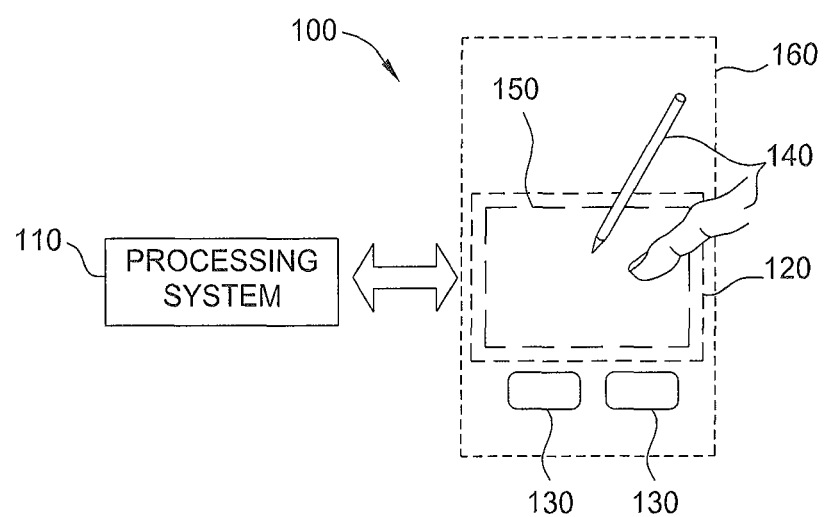
FIG. 1 is a display device having an integrated input device.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include I$^2$C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
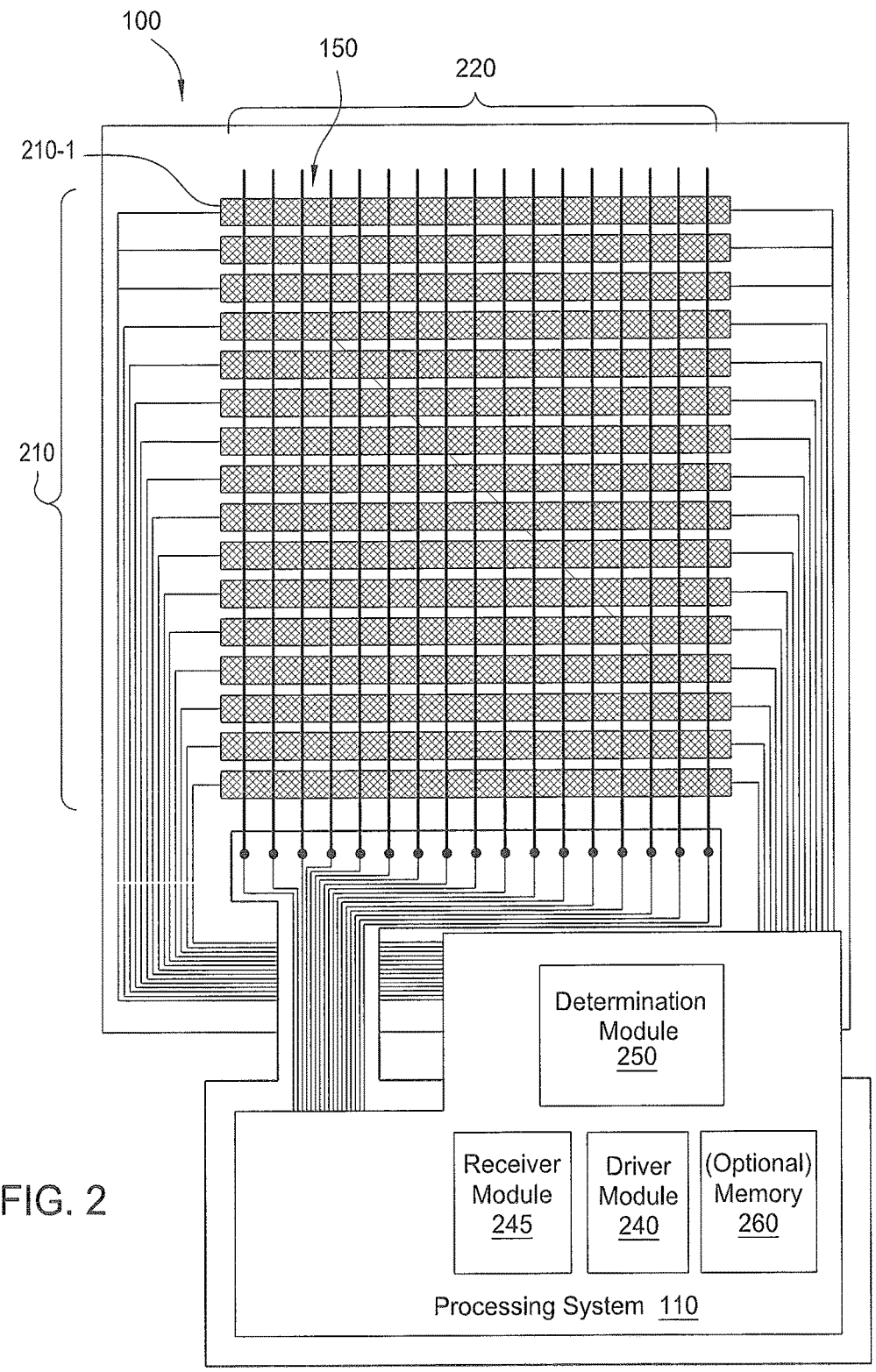
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150, a processing system 110, and shield electrodes 230. The array of sensing elements 150 includes a plurality of transmitter electrodes 210 (e.g., 210-1, 210-2, 210-3, etc.), each of which may comprise one or more common electrodes, and a plurality of receiver electrodes 220 (e.g., 220-1, 220-2, 220-3, etc.). The processing system 110 may include a driver module 240, a receiver module 245, a determination module 250, and an optional memory 260.

The processing system IC 110 is coupled to the transmitter electrodes 210 through a plurality of conductive routing traces. The conductive routing traces may be shielded from the receiver electrodes 220 by shield electrodes. In other embodiments, each of the receiver electrodes 220 may comprise one or more common electrodes.

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage. In various embodiments, the processing system IC 110 may be coupled to drivers for driving the transmitter electrodes 210. The drivers may be fabricated using thin-film-transistors (TFT) and may comprise switches, combinatorial logic, multiplexers, and other selection and control logic.

The driver module 240, which includes driver circuitry, included in the processing system IC 110 may be configured for updating images on the display screen of the display device 160. For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system IC 110 is configured to operate the common electrodes as transmitter electrodes for input sensing by driving transmitter signals onto the common electrodes.

While the processing system illustrated in FIG. 2 includes one IC, the processing system may be implemented with more ICs to control the various components in the input device. For example, the functions of the processing system IC 110 may be implemented in more than one integrated circuit that can control the display module elements (e.g., common electrodes) and drive transmitter signals and/or receive resulting signals received from the array of sensing elements 150. In embodiments where there is more than one processing system IC 100, communications between separate processing system ICs 110 may be achieved through a synchronization mechanism, which sequences the signals provided to the transmitter electrodes 210. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined. The transmitter electrodes may transmit transmitter signal bursts. Transmitter signal bursts may include multiple transmitter signal cycles (e.g., 20-40 capacitance samples). Typically, two or more transmitter signal bursts may be transmitted for each row for each capacitive frame.

The receiver sensor electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some touch screen embodiments, the transmitter electrodes 210 comprise one or more common electrodes (e.g., "V-com electrodes") used in updating the display of the display screen. In other embodiments, the receiver electrodes 220 comprise one or more common electrodes (e.g., "V-com electrodes") used in updating the display of the display screen. In further embodiments, the transmitter electrodes 210 and receiver electrodes 220 comprise one or more common electrodes (e.g., "V-com electrodes") used in updating the display of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), a glass substrate of an organic light emitting diode (OLED), etc. In such embodiments, the common electrode can also be referred to as a "combination electrode," since it performs multiple functions. In various embodiments, two or more transmitter electrodes 210 may share at one or more common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Figure 3:
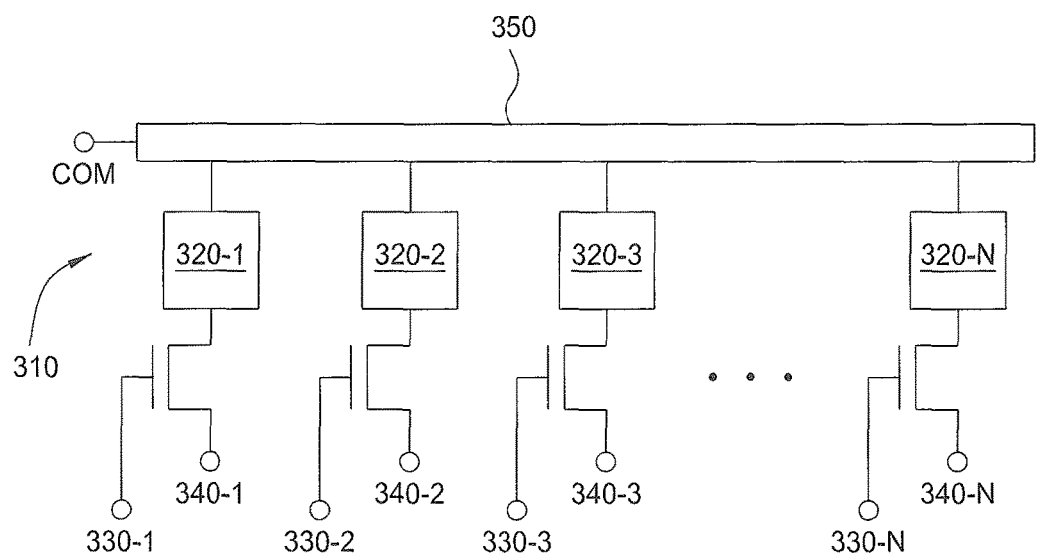
FIG. 3 is a partial schematic view of the display device coupled to a common electrode of the input device of FIG. 2.

FIG. 3 is a partial schematic view of the display device 160 coupled to a common electrode 350 configured to operate as a transmitter electrode 210 in the input device 100 of FIG. 2. The display device 160 includes a plurality of display rows 310, with each display row 310 including a plurality of sub-pixels 320-1, 320-2, 320-3, . . . , 320-N (collectively "sub-pixels 320") and sub-pixel circuitry configured for display updating. The sub-pixel circuitry associated with each sub-pixel 320 may include a select line 330 (e.g., 330-1, 330-2, 330-3, . . . , 330-N) and a source line 340 (e.g., 340-1, 340-2, 340-3, . . . , 340-N). A select signal may be received by a select line 330 to select one or more sub-pixels 320 for display updating. The selected sub-pixel(s) 320 may then be driven with a source voltage received by the source line 340-N and/or a common voltage received by the common electrode 350.

Although the embodiment illustrated in FIG. 3 includes a separate select line 330 for each sub-pixel 320, in other embodiments, each select line 330 may be configured to select more than one sub-pixel 320 at a time. For example, in one embodiment, a select line 330 may select an entire display row 310 for updating (e.g., sub-pixels 320-1 through 320-N). In other embodiments, a select line 330 may select one or more types of sub-pixels 320, for example, sub-pixels 320 associated with a specific pixel color component (e.g., red, green, blue, yellow, white, etc.) or sub-pixels which comprise one or more pixels.

Once a sub-pixel 320 is selected, a source voltage may be received by the source line 340 to charge the sub-pixel to a predetermined level (e.g., a target voltage or current). The predetermined level may be associated with a desired brightness level of the sub-pixel 320. In other embodiments, one or more sub-pixels 320 may be coupled to a single source line 340 (e.g., through a logic circuit) in order to enable the one or more sub-pixels 320 to be charged to the same predetermined level. In various embodiments, the source voltage may be a substantially constant voltage. In other embodiments, the source voltage may transition between at least two voltages.

The common electrode 350 may be configured to provide a common voltage to the sub-pixels 320. Although the common electrode 350 is illustrated as a single, continuous electrode, in other embodiments, the common electrode 350 may be divided into a plurality of segments, with each segment providing a common voltage to one or more sub-pixels 320.

Figure 5:
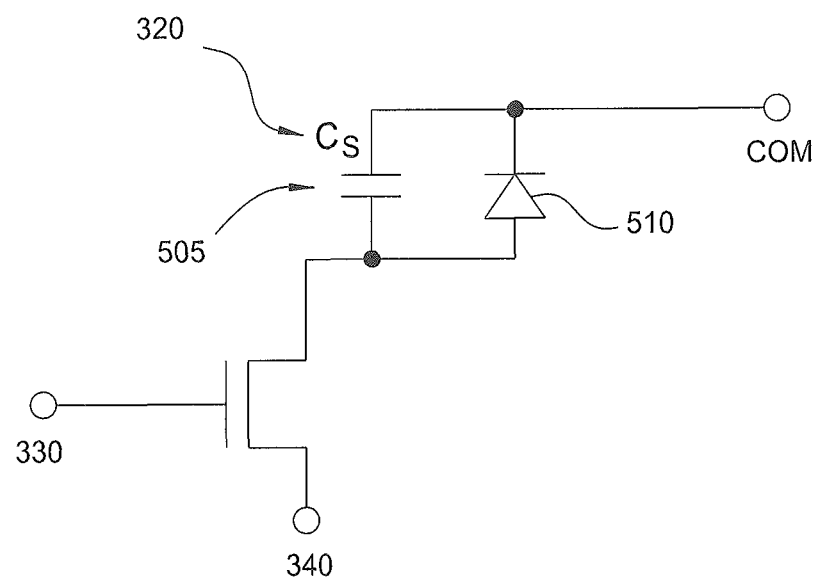

In one embodiment, sub-pixels 320-1 through 320-3 may be associated with a single pixel. For example, sub-pixel 320-1 may represent a red (R) sub-pixel, sub-pixel 320-2 may represent a green (G) sub-pixel, and sub-pixel 320-3 may represent a blue (B) sub-pixel of a single pixel having a RGB sub-pixel arrangement. Additionally, the sub-pixels 320-1, 320-2, 320-3 may be coupled together with a multiplexer (not shown) and driven sequentially for display updating, as shown in FIG. 5, discussed further below. It also is contemplated that other types of sub-pixel arrangements may be used, including, for example, RGBG, RGBW, RGBY, etc.

Each display row 310 of the display device 160 may include any number of sub-pixels 320. For example, an exemplary display device 160 having a resolution of 1280× 768 and a RGB sub-pixel arrangement may include 1280 display rows 310, with each display row 310 including 2304 sub-pixels 320. In another example, a display device 160 having a resolution of 1920×1080 and a RGB sub-pixel arrangement may include 1920 display rows 310, with each display row 310 including 3240 sub-pixels 320. In addition, more than one display row 310 of sub-pixels 320 may be coupled to a single common electrode 350. For example, in the exemplary display device 160 having 1280 display rows 310 and 64 common electrodes 350, 20 display rows 310 of sub-pixels 320 may be coupled to each common electrode 350.

Figure 4:
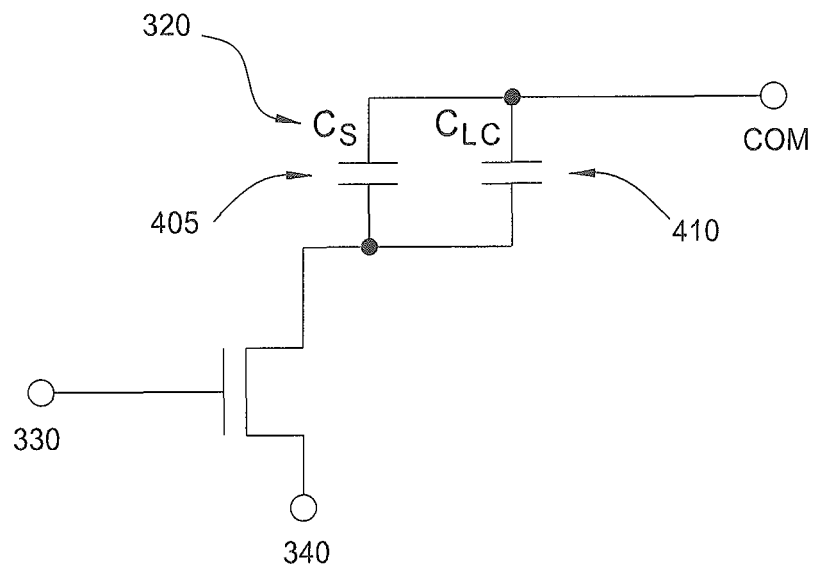
FIGS. 4 and 5 illustrate two exemplary types of sub-pixels suitable for use in the display device of FIG. 3.

FIGS. 4 and 5 illustrate two exemplary types of sub-pixels 320 suitable for use in the display device 160 of FIG. 3. FIG. 4 illustrates a LCD sub-pixel configuration. The LCD sub-pixel configuration includes a liquid crystal (LC) element 410 and an optional storage capacitor 405. During operation of the LCD sub-pixel, the sub-pixel 320 may be selected by a select line 330, and a capacitive element associated with the sub-pixel may be charged to a predetermined level based on a source voltage received by the source line 340 and a common voltage received by the common electrode 350. In one embodiment, during operation of the LCD sub-pixel, the liquid crystal (LC) element 410 may be charged to a predetermined level with a source voltage received by the source line 340 and a common voltage received by the common electrode 350. Once the liquid crystal element 410 has been charged to the desired voltage level, the sub-pixel 320 may be unselected (e.g., by terminating or modulating the select signal). In another embodiment, during operation of the LCD sub-pixel, the sub-pixel 320 may be selected by a select line 330, and the storage capacitor 405 may be charged to a desired level with a source voltage received by the source line 340 and a common voltage received by the common electrode 350. Once the storage capacitor 405 has been charged to the desired voltage level, the sub-pixel 320 may be unselected (e.g., by terminating or modulating the select signal), and the voltage across the storage capacitor 405 may be applied to the LC element 410.

FIG. 5 illustrates an organic light-emitting diode (OLED) sub-pixel configuration. The OLED sub-pixel configuration includes an OLED device 510 and an optional storage capacitor 505. In one embodiment, during operation of the OLED sub-pixel, the sub-pixel 320 may be selected and the OLED device 510 driven to the predetermined level with the source line 340 and the common electrode 350. Once the OLED device 510 has been driven to the predetermined level, the sub-pixel 320 may be unselected. In another embodiment, during operation of the OLED sub-pixel, the sub-pixel 320 may be selected and the storage capacitor 505 charged to a desired level with the source line 340 and the common electrode 350. Once the storage capacitor 505 has been charged to the desired voltage level, the sub-pixel 320 may be unselected, and the voltage across the storage capacitor 505 may be applied to the OLED device 510.

Although FIGS. 4 and 5 illustrate two exemplary display technologies (i.e., LCD and OLED), the techniques described herein may be implemented with other types of pixel and sub-pixel display technologies as well. Further, although FIGS. 4 and 5 each illustrate a single, optional storage capacitor 405, 505, it is contemplated that each sub-pixel 320 may include more than one storage capacitor.

In general, in a display device having an integrated sensing device, display updating and input sensing may be performed during separate and distinct time periods. Thus, during a display update period, common electrodes are held at a substantially constant reference voltage, and the source lines are driven with a source voltage to update one or more sub-pixels. Further, during an input sensing period (e.g., a horizontal or vertical blanking period), one or more common electrodes are modulated with one or more voltage transitions. Importantly, however, the display update and touch sensing periods do not overlap.

Concurrent Input Sensing and Display Updating

In various embodiments of the present invention, input sensing may be performed concurrently with display updating. Specifically, a common electrode 350 coupled to a sub-pixel 320 may be modulated for input sensing while a source line 340 coupled to the sub-pixel 320 is driven with a source voltage for display updating. In one embodiment, while the sub-pixel 320 is driven for display updating, the common electrode 350 coupled to the sub-pixel 320 may be modulated above and below a reference voltage. In this embodiment, the common electrode 350 may be operated for input sensing while still providing a reference voltage to the sub-pixel 320 and, thus, without negatively affecting the resulting voltage across the sub-pixel 320 at the end of the driving period. Accordingly, input sensing may be performed concurrently with display updating without significantly affecting the images displayed by the display device 160. Advantageously, by enabling input sensing to be performed concurrently with display updating, dedicated input sensing periods may be avoided, and the amount of time available for input sensing is significantly increased.

Figure 6:
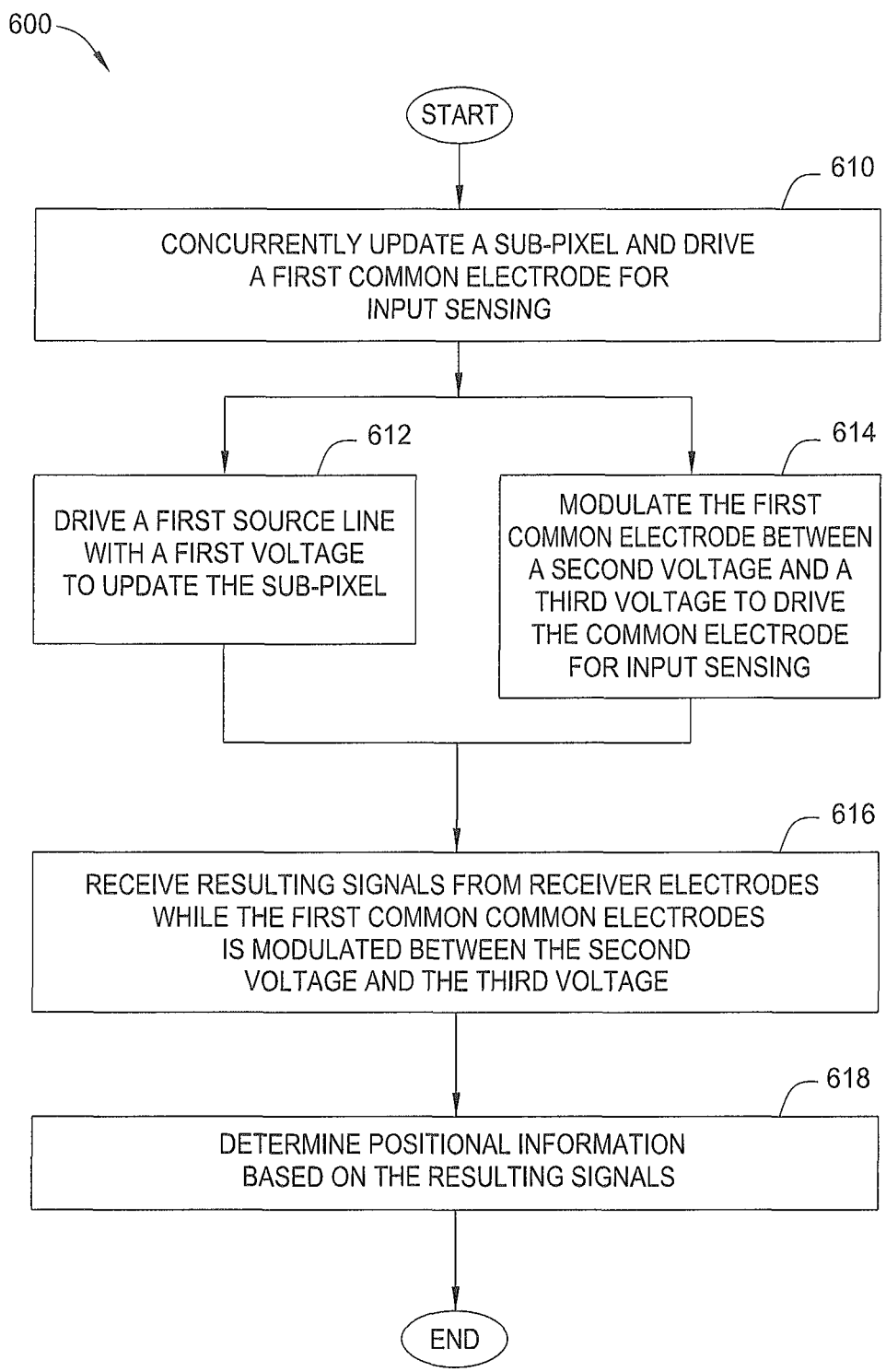
FIG. 6 is a flow diagram of method steps for concurrently performing input sensing and display updating in the input device of FIGS. 1-5.
Figure 7A:
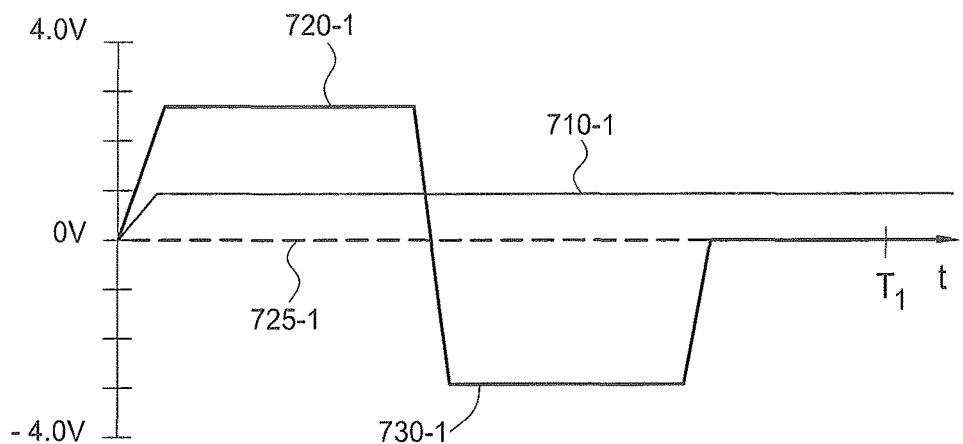
FIGS. 7A-7G illustrate the voltages associated with a sub-pixel as a function of time in accordance with several exemplary implementations of the method of FIG. 6.

FIG. 6 is a flow diagram of method steps for concurrently performing input sensing and display updating in the input device 100 of FIGS. 1-5. FIG. 7A illustrates the voltages applied to a source line 340 and a common electrode 350 as a function of time in accordance with an exemplary implementation of the method of FIG. 6. Although the method steps are described in conjunction with FIGS. 1-5 and 7A, persons skilled in the art will understand that any system configured to perform the method steps, in any appropriate order, falls within the scope of the present invention.

The method begins at step 610, where a sub-pixel 320 is updated while a common electrode 350 coupled to the sub-pixel 320 is concurrently driven for input sensing (e.g., capacitive sensing). The sub-pixel 320 may be updated by driving a source line 340 coupled to the sub-pixel 320 with a first voltage signal 710-1 at step 612. Although the first voltage signal 710-1 is illustrated as a constant voltage, in other embodiments, the first voltage signal 710-1 may be modulated between two or more voltage levels. Concurrently, at step 614, a common electrode 350 coupled to the sub-pixel 320 may be modulated between a second voltage 720-1 and a third voltage 730-1 to perform input sensing, as shown in FIG. 7A. As a result, in this embodiment, the sub-pixel 320 is driven by both the common electrode 350 and the source line 340 during the concurrent input sensing and display updating period. Additionally, the voltages at which the common electrode 350 is modulated may be selected with regard to the voltage(s) at which the source line 340 is driven such that, at the end of the driving period, the sub-pixel 320 brightness reaches a predetermined level. Additionally, the first voltage signal 710-1 driven to the source line 340 may be selected to provide the correct brightness based on known voltage transitions of the common electrode 350.

FIG. 7A illustrates an embodiment in which a common electrode 350 is modulated above and below a reference voltage 725-1. However, it is contemplated that other methods of modulating the common electrodes 350 to drive a sub-pixel 320 to a desired level may be used. In various embodiments, the driver module 240 of FIG. 2 may be operated according to the techniques illustrated in FIGS. 7A-7G to simultaneously update a sub-pixel 320 and drive one or more common electrodes 350 (e.g., a first common electrode and a second common electrode) for capacitive sensing by modulating the common electrode(s) 350 between two or more voltages.

Figure 7B:
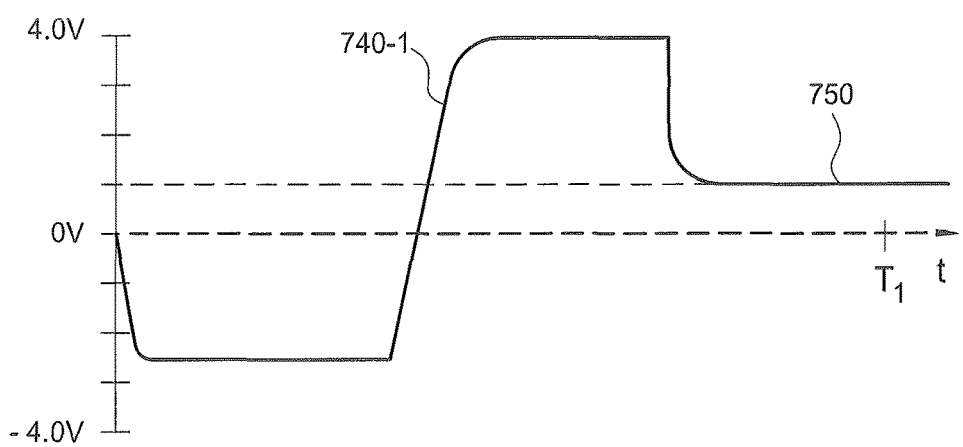

FIG. 7B illustrates the resulting voltage 740-1 across the sub-pixel 320 as a function of time when the sub-pixel 320 is driven with the voltages illustrated in FIG. 7A. Importantly, although modulation of the common electrode 350 (and/or modulation of the first voltage signal 710-1 supplied to the source line 340) may distort the trajectory of the resulting voltage 740-1 across the sub-pixel 320, the voltages of the common electrode 350 and source line 340 may be selected such that, at the end of the driving period $T_1$, the sub-pixel 320 is charged to a target voltage 750. The driving period $T_1$ may be based on factors including the display resolution, the sub-pixel arrangement, and the display refresh rate. For instance, in a display device 160 having a resolution of 1280×768, a RGB sub-pixel arrangement, and a refresh rate of 60 Hz, approximately 13 microseconds (μs) may be allotted for updating each display line. Thus, assuming that each type of sub-pixel 320 (e.g., R, G or B) in a given display line is updated sequentially, the driving period $T_1$ allotted to each sub-pixel 320 may be less than approximately 4.3 μs (e.g., 2-3 μs). Further, if the display device is refreshed 60 times per second, after the sub-pixel 320 has been driven to a predetermined level, the sub-pixel 320 remains at or near that level for approximately 16.7 milliseconds (ms), after which the sub-pixel 320 may again be selected and driven to a different level. Consequently, although the resulting voltage 740-1 across the sub-pixel 320 may fluctuate above or below the target voltage 750 during the driving period $T_1$, such fluctuations are relatively brief and are imperceptible (or nearly imperceptible) to the user. Although exemplary embodiments have been described in conjunction with specific device specifications (e.g., resolution, refresh rate, driving period), persons skilled in the art will understand that the techniques disclosed herein may be applied to other devices having different specifications and characteristics.

Figure 7C:
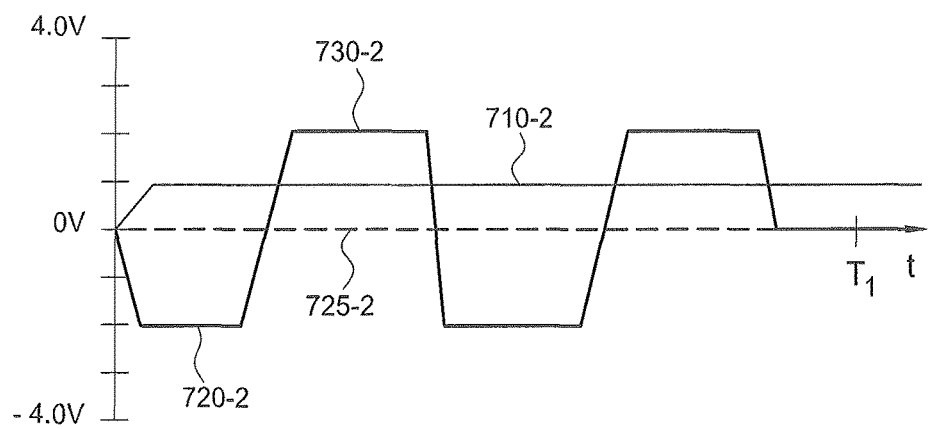
Figure 7D:
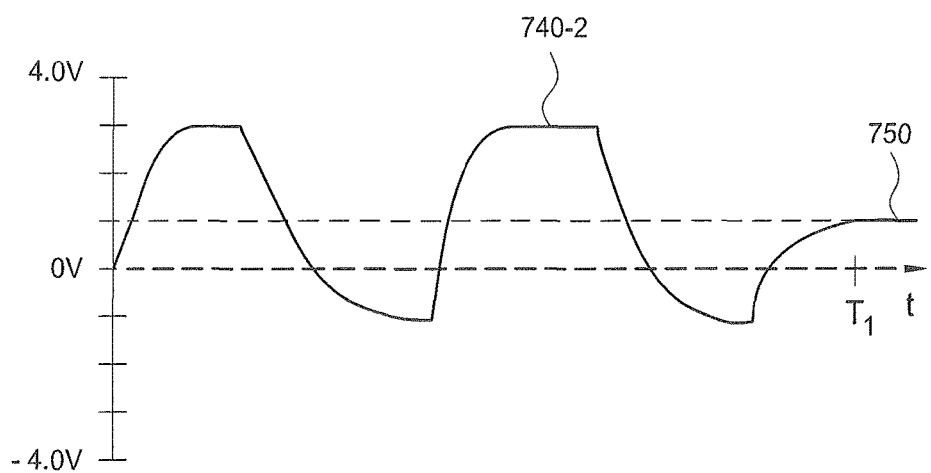

FIG. 7C illustrates an embodiment in which the common electrode 350 is modulated above and below a reference voltage 725-2 at a higher frequency, a lower voltage, and a different phase than is depicted in FIG. 7A; however, each of a higher frequency, lower voltage and different phase may be applied independently or in any combination. FIG. 7D illustrates the resulting voltage 740-2 across the sub-pixel 320 as a function of time when the sub-pixel 320 is driven with the voltages illustrated in FIG. 7C. Modulating the common electrode 350 at a higher frequency and/or at lower voltage(s) may reduce the magnitude of voltage fluctuations across the sub-pixel 320. Although each of FIGS. 7A and 7C illustrate a reference voltage 725 of zero volts (V), non-zero reference voltages may be used as well.

Figure 7E:
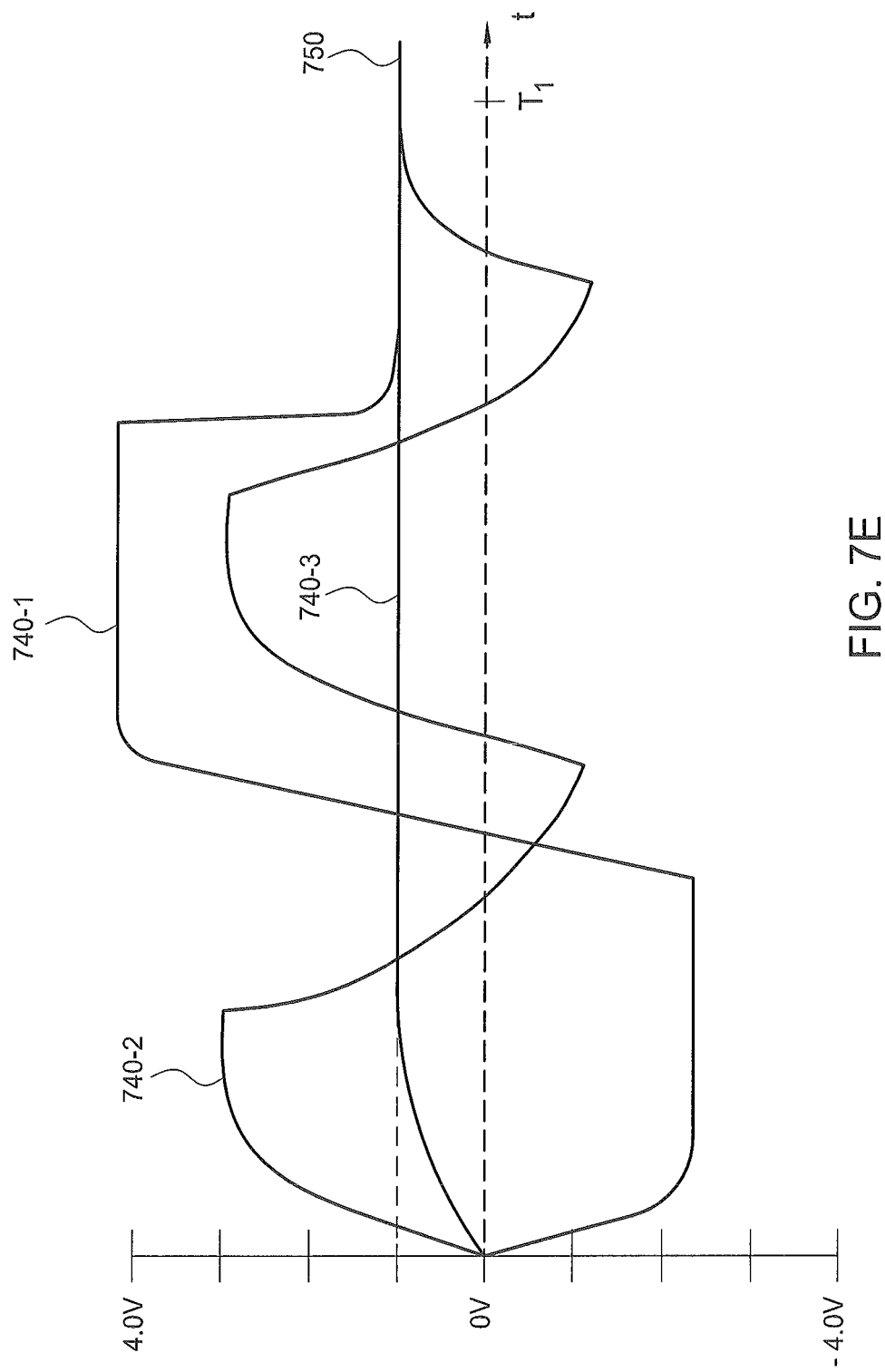

FIG. 7E illustrates the resulting voltages 740-1, 740-2 across the sub-pixel 320 as a function of time when the sub-pixel 320 is driven with the voltages illustrated in FIGS. 7A and 7C. For the purpose of comparison, FIG. 7E further illustrates the resulting voltage 740-3 across the sub-pixel 320 when the source line 340 coupled to the sub-pixel 320 is driven with a first voltage signal 710, and the common electrode 350 coupled to the sub-pixel 320 is held at a substantially constant reference voltage (i.e., the common electrode 350 is not modulated for input sensing). As shown, in each technique, the sub-pixel 320 is charged to the target voltage 750 by the end of the driving period $T_1$.

In various embodiments, other techniques for modulating one or more common electrodes 350 for input sensing while driving one or more sub-pixels 320 for display updating may be utilized. For instance, different modulation frequencies, waveforms, polarities, and phases may be used, and voltages which are higher or lower than those illustrated in FIGS. 7A and 7C may be used. Additionally, although FIGS. 7A and 7C both illustrate an even number of voltage transitions (e.g., transitions from a voltage 720 to a voltage 730), any integer or non-integer number of voltage transitions may occur during each driving period $T_1$ to achieve the desired resulting voltage 750 across the sub-pixel 320.

Figure 7F:
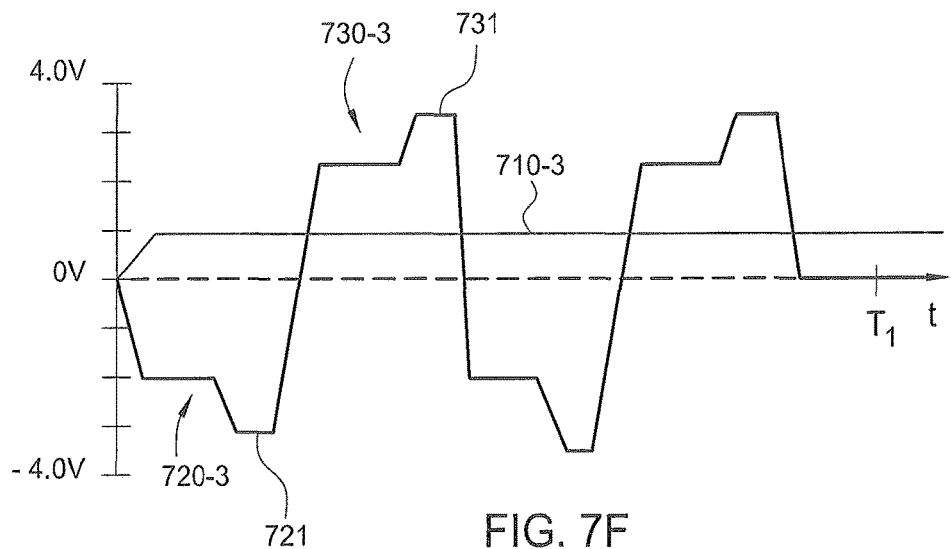
Figure 7G:
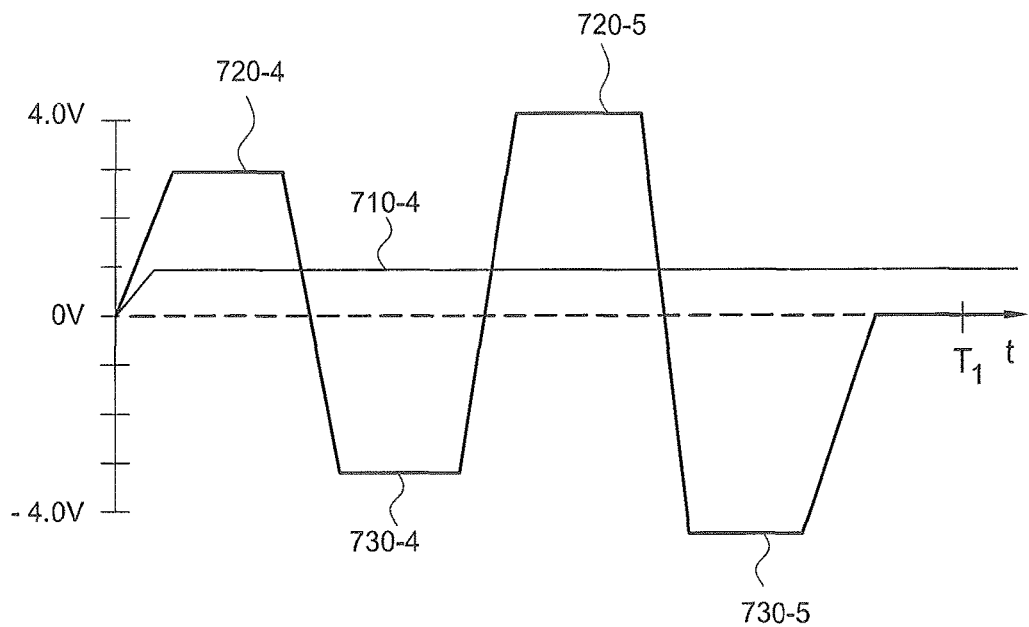

FIGS. 7F and 7G illustrate embodiments in which the common electrode 350 is driven with various multi-level square waves. As shown, the common electrode 350 may be modulated in a variety of ways when concurrently performing input sensing and display updating. For example, as shown in FIG. 7F, the voltage of the common electrode 350 may be modulated between voltages of the same polarity. That is, the common electrode 350 may be modulated between a second voltage (e.g., 720-3) and a third voltage (e.g., 730-3) and between the second (or third) voltage and a fourth voltage (e.g., 721 or 731), as shown in FIG. 7F. In addition, as shown in FIG. 7G, the voltages at which the common electrode 350 is modulated may be varied during the driving period $T_1$. Although FIGS. 7A, 7C, 7F and 7G illustrate square waveforms, any shape or type of waveform may be used.

In still other embodiments, the voltage(s) at which the common electrode 350 is modulated may be adjusted by the processing system 110 during the driving period $T_1$, for example, in order to ensure that the sub-pixel 320 is charged to the desired target voltage 750. In one example, the processing system 110 may determine that, given the current modulation technique or waveform, the sub-pixel 320 may overshoot or undershoot the target voltage 750. In response, the processing system 110 may increase or decrease one or more voltages applied to the common electrode 350 and/or source line 340 to enable the sub-pixel 320 to reach the desired target voltage 750 at the end of a driving period $T_1$. In another example, the processing system 110 may determine that, at the end of one or more past periods $T_N$, the voltage across the sub-pixel 320 was above or below a target voltage 750. In response, the processing system 110 may increase or decrease one or more voltages applied to the common electrode 350 and/or source line 340 to enable the sub-pixel 320 to reach the desired target voltage 750 at the end of the current or future driving periods $T_N$. By enabling input sensing to be performed concurrently with display updating, instead of during dedicated input sensing time periods, the rate(s) at which input sensing and/or display updating is performed may be varied in response to internal or external sources of interference. For example, if noise (e.g., electromagnetic interference) externally coupled to the input device 100 (e.g., via an external battery charging module) interferes with resulting signals received by the receiver electrodes 220, the rate at which input sensing is performed may be varied. Additionally, if the input sensing rate is tied to or associated with the display refresh rate, the display refresh rate may be varied to decrease the effects of interference. In various embodiments, the driver module 240 may update the sub-pixel 320 at a first update frequency, detect interference associated with performing capacitive sensing at the first update frequency, and, in response, transition from the first update frequency to a second update frequency. For example, a device having an image refresh rate of 60 Hz may be decreased to 57 Hz or increased to 63 Hz in order to reduce the effect of internal or external source of interference.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for a display device integrated with a capacitive sensing device, the processing system comprising:
a driver module comprising driver circuitry, the driver module coupled to a sub-pixel with a first source line and a first common electrode, wherein the first common electrode is directly coupled to the sub-pixel, and wherein the driver module is configured to:
update the sub-pixel by driving the first source line with a first voltage; and
drive, while the first voltage is driven onto the sub-pixel, the first common electrode for capacitive sensing by modulating the first common electrode between a second voltage and a third voltage, wherein the first voltage driven on the first source line is selected based on voltage transitions used to modulate the first common electrode;
a receiver module coupled to a plurality of receiver electrodes configured to receive resulting signals from the receiver electrodes while the first common electrode is modulated between the second voltage and the third voltage; and
a determination module configured to determine positional information based on the resulting signals.

2. The processing system of claim 1, wherein updating the sub-pixel comprises driving a capacitive element associated with the sub-pixel to a predetermined level to achieve a first brightness level of the sub-pixel.

3. The processing system of claim 1, wherein updating the sub-pixel comprises driving a light-emitting diode associated with the sub-pixel to a predetermined level to achieve a first brightness level of the sub-pixel.

4. The processing system of claim 1, wherein the driver module is configured to simultaneously update the sub-pixel, drive the first common electrode for capacitive sensing, and drive a second common electrode for capacitive sensing by modulating the second common electrode between the second voltage and the third voltage.

5. The processing system of claim 1, wherein the driver module is configured to simultaneously update the sub-pixel and drive the first common electrode for capacitive sensing by modulating the first common electrode between the second voltage and the third voltage and between the second voltage and a fourth voltage.

6. The processing system of claim 1, wherein the driver module is configured to:
update the sub-pixel at a first update frequency;
detect interference associated with the capacitive sensing; and
transition from the first update frequency to a second update frequency.

7. The processing system of claim 1, wherein modulating the first common electrode between the second voltage and the third voltage comprises driving the first common electrode with a substantially square waveform.

8. A display device integrated with a capacitive sensing device comprising:
a sub-pixel;
a first source line coupled to the sub-pixel;
a first common electrode directly coupled to the sub-pixel;
a plurality of receiver electrodes; and
a processing system coupled to the first source line, first common electrode, and plurality of receiver electrodes, the processing system configured to:
update the sub-pixel and drive the first common electrode for capacitive sensing by:
driving the first source line with a first voltage; and
modulating, while the first voltage is driven onto the sub-pixel using the first source line, the first common electrode between a second voltage and a third voltage, wherein the first voltage driven on the first source line is selected based on voltage transitions used to modulate the first common electrode;
receive resulting signals from the receiver electrodes while the first common electrode is modulated between the second voltage and the third voltage; and
determine positional information based on the resulting signals.

9. The display device of claim 8, wherein updating the sub-pixel comprises driving a capacitive element associated with the sub-pixel to a predetermined level to achieve a first brightness level of the sub-pixel.

10. The display device of claim 8, wherein updating the sub-pixel comprises driving a light-emitting diode associated with the sub-pixel to a predetermined level to achieve a first brightness level of the sub-pixel.

11. The display device of claim 8, wherein the processing system is configured to simultaneously update the sub-pixel, drive the first common electrode for capacitive sensing, and drive a second common electrode for capacitive sensing by modulating the second common electrode between the second voltage and the third voltage.

12. The display device of claim 8, wherein the processing system is configured to simultaneously update the sub-pixel and drive the first common electrode for capacitive sensing by modulating the first common electrode between the second voltage and the third voltage and between the second voltage and a fourth voltage.

13. The display device of claim 8, wherein the processing system is configured to:
update the sub-pixel at a first update frequency;
detect interference associated with the capacitive sensing; and
transition from the first update frequency to a second update frequency.

14. The display device of claim 8, wherein modulating the first common electrode between the second voltage and the third voltage comprises driving the first common electrode with a substantially square waveform.

15. A method of capacitive sensing with a display device integrated with a capacitive sensing device having a sub-pixel, a first source line coupled to the sub-pixel, a first common electrode directly coupled to the sub-pixel, and a plurality of receiver electrodes, the method comprising:
updating the sub-pixel and driving the first common electrode for capacitive sensing by:
driving the first source line with a first voltage; and
modulating, while the first voltage is driven onto the sub-pixel using the first source line, the first common electrode between a second voltage and a third voltage, wherein the first voltage driven on the first source line is selected based on voltage transitions used to modulate the first common electrode;
receiving resulting signals from the receiver electrodes while the first common electrode is modulated between the second voltage and the third voltage; and
determining positional information based on the resulting signals.

16. The method of claim 15, wherein updating the sub-pixel comprises driving a capacitive element associated with the sub-pixel to a predetermined level to achieve a first brightness level of the sub-pixel.

17. The method of claim 15, wherein updating the sub-pixel comprises driving a light-emitting diode associated with the sub-pixel to a predetermined level to achieve a first brightness level of the sub-pixel.

18. The method of claim 15, further comprising simultaneously updating the sub-pixel, driving the first common electrode for capacitive sensing, and driving a second common electrode for capacitive sensing by modulating the second common electrode between the second voltage and the third voltage.

19. The method of claim 15, further comprising simultaneously updating the sub-pixel and driving the first common electrode for capacitive sensing by modulating the first common electrode between the second voltage and the third voltage and between the second voltage and a fourth voltage.

20. The method of claim 15, further comprising:
updating the sub-pixel at a first update frequency;
detecting interference associated with the capacitive sensing; and
transitioning from the first update frequency to a second update frequency.

* * * * *